Nov. 24, 1964  T. R. CARRELL ETAL  3,158,380
JOINT SEAL
Filed Aug. 1, 1961  2 Sheets-Sheet 1

INVENTORS
THEODORE R. CARRELL
TOMMY J. McCUISTION
BY
John N. Wolfram
ATTORNEY

INVENTORS
THEODORE R. CARRELL
TOMMY J. McCUISTION
BY
ATTORNEY

United States Patent Office 3,158,380
Patented Nov. 24, 1964

3,158,380
JOINT SEAL
Theodore R. Carrell, Los Angeles, and Tommy J. McCuistion, Playa Del Rey, Calif., assignors to Parker-Hannifin Corporation, Cleveland, Ohio, a corporation of Ohio
Filed Aug. 1, 1961, Ser. No. 128,581
1 Claim. (Cl. 277—235)

This invention relates to seals for joints and more particularly to a sealing washer for sealing the joint between a pair of members having opposed surfaces.

The invention is applicable, for example, to flanged pipe joints in which flanges on the pipes provide a pair of flat opposed surfaces. The sealing washer is insertible between the surfaces and is tightly clamped by the same. The washer includes a channel open to the interior of the pipes and forming two flexible lips each of which carries a resilient packing of special design. Fluid from the interior of the pipes has access to the channel and the pressure of such fluid imposes a spreading action on the lips to maintain the same in tight contact with the flange surfaces, even though the flange surfaces may separate slightly from the main body of the washer due to excess stress on the bolts or other means for clamping the flanges and washers together. A means is also provided for avoiding separation of the resilient packings from the flange surfaces during such a slight separation where such separation would otherwise occur due to bridging or distortion of the lips during spreading of the same.

It is an object of the invention to provide a joint with a sealing washer having lips spreadable by fluid pressure in which the axially outer surfaces of the lips are coplanar with the end faces of the main body of the washer to facilitate manufacture and also so that the main body can provide a positive limit to the clamping movement of the flange surfaces toward the washer at substantially the same time that lip surfaces adjacent the resilient packings engage the flange surfaces.

It is another object to provide a sealing washer of the type described in which grooves in the flexible lips carry the resilient seals and the resilient seals have portions which initially project from the grooves and which are deformable by contact with the flanges into voids initially provided within the resilient seals, the volume of such projecting portions being substantially the same as the volume of the voids whereby the resilient seals will substantially fill the grooves when lip surfaces adjacent the resilient seals contact the flanged surfaces.

Another object is to provide relatively narrow faces on the lips radially inward of the resilient seals so that spreading of the lips by fluid pressure within the channel between the lips will not cause the resilient seals to be separated from the flange surfaces due to greater spreading of the lips at their smallest diameter with resultant contact of only the inner corner of the lips with the flange surfaces when the flange surfaces move slightly in a direction away from washer due to overstressing of the clamping means.

It is another object to provide a sealing washer of the type described in which narrow lip faces radially inward of the resilient seals are formed by relieving or chamfering the lips adjacent said narrow faces.

It is another object to provide a sealing washer of the type described in which the portion of the lips at the bottom of the grooves containing the resilient seals is thin so as to permit the same to flex slightly as the lips are spread by fluid pressure whereby the outer edges of the grooves may maintain intimate contact with the flange surfaces to prevent extrusion of the resilient seal therebetween.

Another object is to provide a sealing washer of the type described in which a weakening groove is provided exteriorly of the grooves containing the resilient seals for further facilitating distortion of the lips by fluid pressure in such a manner that the edges of the lips on each side of the grooves will retain intimate contact with the flange surfaces when the lips are spread.

Other objects will be apparent from the following description and from the drawings in which.

Figure 1:
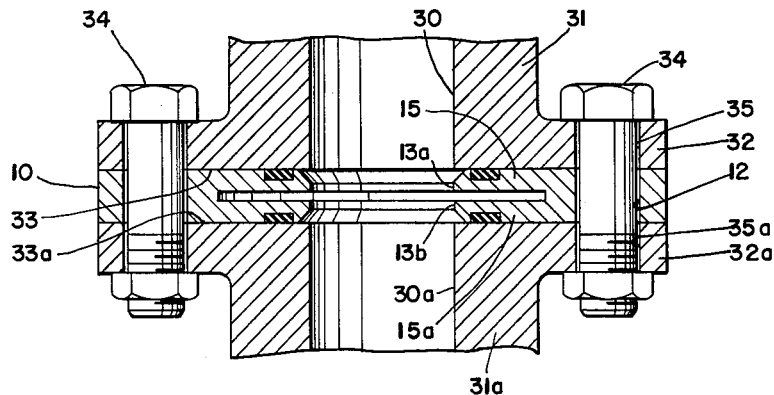
FIG. 1 is a cross section view of a flanged pipe joint utilizing the invention.
Figure 2:
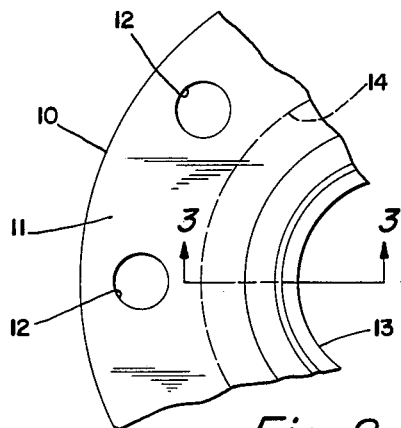
FIG. 2 is a fragmentary top view of the sealing washer.
Figure 3:
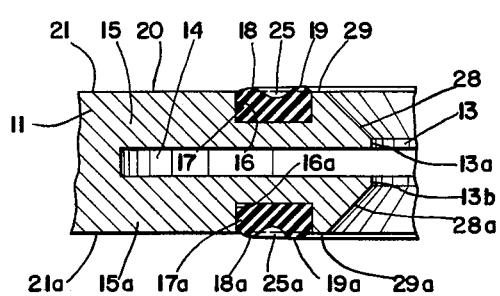
FIG. 3 is an enlarged fragmentary section view along the lines 3—3 of FIG. 2.

Washer 10 is of metal, plastic, or other relatively rigid material and includes an annular radially outward portion 11 which is solid except for bolt holes 13 and therethrough. The washer has a central opening 13 therethrough. A channel 14 communicates with opening 12 forms a pair of annular lips 15 and 15a which are thin enough to flex or spread axially outwardly by action of fluid pressure within channel 14.

Formed in the lips are axially outwardly facing annular grooves 16, 16a. These grooves contain resilient seals 17, 17a. The seals are preferably initially formed with portions 18, 18a, 19, 19a which project axially outwardly of the transverse outer faces 20, 20a of the lips. Faces 20, 20a are preferably coplanar with the transverse end surfaces 21, 21a of solid portion 11 of the washer.

Resilient seals 17, 17a are also initially formed with grooves forming voids 25, 25a contained within the confines of grooves 16, 16a. The total volume of projecting portions 18, 18a, is substantially the same as the volume of void 25. Likewise, the volume of projecting portions 19, 19a is substantially the same as the volume of void 25a.

Grooves 16, 16a are preferably spaced an appreciable radial distance from circumferential wall portions 13a, 13b of openings 13, as for example ⅛" on a sealing washer having an opening 13 of 7¼" diameter.

The radially inner portion of each of the lips 15, 15a is relieved by chamfers 28, 28a so as to leave only narrow faces 29, 29a adjacent grooves 16, 16a. Faces 29, 29a are preferably substantially co-planar with faces 21, 21a.

Pipes 31, 31a have laterally extending flanges 32, 32a with flat end surfaces 33, 33a which are in opposed relation to each other when the flanges are brought toward each other by means of bolts 34 passing through holes 35, 35a in the flanges and through holes 12 in washer 10. Opening 13 is preferably of the same diameter as openings 30, 30a of flanges pipe members 31, 31a.

When it is desired to make up a joint, washer 10 is interposed between the flange surfaces 33, 33a and bolts 34 are tightened until flange surfaces 33, 33a contact surfaces 21, 21a of the washer, at which time further tightening movement of the flanges toward the washer is stopped. At this time surfaces 33, 33a will also engage faces 20, 20a and 29, 29a of washer lips 15, 15a.

Prior to contact of surfaces 33, 33a with the axially outer faces of the sealing washer, as just described, projecting portions 18, 18a, 19, 19a will sealingly engage surfaces 33, 33a. As the joint is further tightened, projecting portions 18, 18a 19, and 19a will be deformed to a position within grooves 16, 16a. Since resilient seals 17, 17a are made of rubber-like material which is relatively incompressible, such deformation will cause the resilient seals to occupy the space initially provided by voids 25, 25a whereby the resilient seals will susbtantially completely fill grooves 16, 16a.

When the pipes are subsequently filled with fluid, pressure thereof within the channel 14 will act upon the lips to urge faces 20, 20a and 29, 29a into tight engagement with the flange surfaces, the intensity of such engagement increasing as the pressure of the fluid increases.

In the event the joint is subjected to excessive mechanical loads or to excessive fluid pressure, bolts 34 may become overstressed and yield in an axial direction so as to permit slight separating movement of flanges 32, 32a. Because of the flexible character of lips 15, 15a, such separating movement will be accompanied by a spreading of the same by fluid pressure acting within channel 14. Such spreading of the lips tends to be greater near the inside diameter than toward the outer diameter so that corners 40 of the lips remain in contact with surfaces 33, 33a but there is a tendency for slight separation of the remaining portion of the lips from such flange surfaces, the amount of such separation tending to gradually increase toward the outer diameter of the lips.

Figure 4:
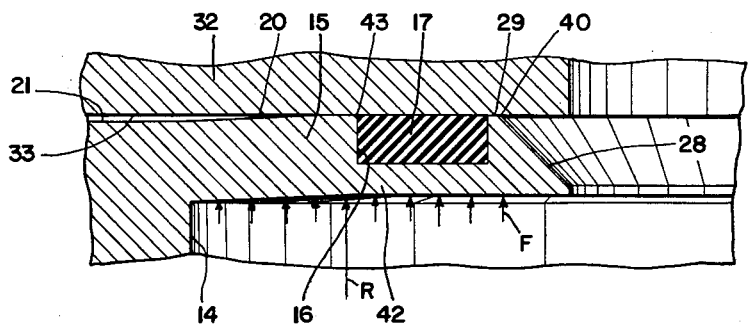
FIG. 4 is an enlarged partial view in section showing the joint when slightly overstressed.

Since corners 40 are close to grooves 16, 16a, that is, on the order of 1/32 inch, the lip surface portions immediately adjacent both sides of grooves 16, 16a will tend to separate from surfaces 33, 33a, as shown in FIG. 4, when flange surface 33 separates from washer surface 21 by only a small amount. This tendency is compensated for by slight bending or distortion of the relatively thin portion 42 of the lips under the resilient seals so that outer edges 43 of grooves 16, as well as the entire narrow surface 29, remain in intimate contact with flange surface 33 as the lips spread. This slight bending or distortion of the portion 42 is caused by forces F which result from fluid under pressure acting on the lips. Upon initial spreading of the lips, each of the corners 40 engages the respective surface 33, 33a and becomes a fulcrum point such that the resultant R, of the forces F, acts on the inner face of the respective lip to force the edge 43 into surface to surface contact with the respective flat end surface 33. A like condition exists with respect to lip 15a and flange surface 33a.

Figure 5:
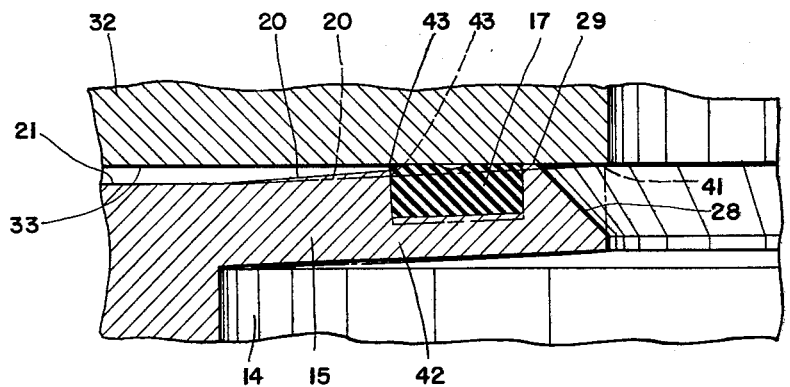
FIG. 5 is a view like FIG. 4 but showing the joint greatly overstressed.

In the event the joint is overstressed a greater amount with consequent greater separation of the flange surfaces from the washer, as shown in FIG. 5, bending of the thin portion 42 of the lip may not be sufficient to keep edge 43 from separating slightly from flange surface 33. However such separation is kept to a minimum by means of chamfer 28 which leaves only the very narrow face 29 adjacent the inner margin of seal 17. Thus if the chamfer were not provided, face 29 would extend to the position of corner edge 41 as shown in dotted outline. Edge 41 would then cause groove edge 43 and face 20 to be in the dotted positions shown with the result that the gap between edge 43 and flange surface 33 would be greater than when the chamfer is provided and might even permit loss of sealing contact of seal 17 from flange surface 33. A like condition would exist with respect to lip 15a and flange surface 33a.

Figure 6:
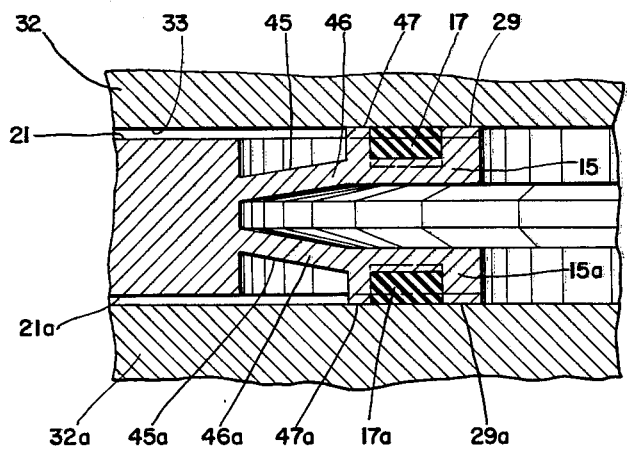
FIG. 6 is a fragmentary section view of a modified form of sealing washer.

FIG. 6 shows a modified form of the invention in which annular or circular grooves 45, 45a are provided in lips 15, 15a radially outward of resilient seals 17, 17a to provide relatively thin and flexible lip portions 46, 46a at the bottom of such grooves and providing narrow surface portions 47, 47a next to the resilient seals which are initially co-planar with surfaces 20, 20a, and 29, 29a, as indicated by the dotted lines. Upon spreading of lips 15, 15a by fluid pressure when flange surfaces 33, 33a separate slightly as aforesaid, the portions 46, 46a distort as shown in solid outline to permit surfaces 47, 47a to retain intimate contact with flange surfaces 33, 33a to prevent extrusion of the resilient seals therebetween. Surfaces 29, 29a will also retain flat intimate contact with flange surfaces 47, 47a and therefore chamfers 28, 28a may be omitted in this form.

Although two embodiments of a joint and a sealing washer therefor are shown and described, it is obvious that the washer is applicable to other types of joints, as for example a closure plate for an opening in a housing for a valve or other article, and that other specific configurations for the washer and the resilient elements may be employed and still embrace the invention as defined by the following claim.

We claim:

A sealing washer for interposition between a pair of members having opposed surfaces, said washer being annular and having a central co-axial opening for passage of fluid therethrough, an annular radially disposed channel means formed in said sealing washer and extending radially outward from said opening and communicating therewith throughout the full circumferential extent, said channel means splitting said sealing washer transversely to define substantially identical but opposed lips, each lip having a transverse outer face and a transverse inner face, said inner faces defining said channel means, each transverse outer face having an annular groove therein overlying said channel means and dividing said outer face into radially inner and outer portions, said groove having a radial extent that is greater than the radial extent of said inner portion and less than the radial extent of said outer portion, said outer portion having a radially inward edge, a resilient sealing element of a material capable of cold flow being disposed in said annular groove and partially protruding therefrom, said groove having a sufficient volume to receive all of said sealing element when same is under compression, the portion of each said lip separating the groove from the channel being of substantially less thickness than the thickness of adjacent portions of said lip, said inner faces being subjectable to fluid pressure action in said channel for deforming said lips to move said inner and outer portions into contact with adjacent portions of said opposed surfaces, the said portions of said lips between said grooves and said channel being sufficiently thin to deflect under fluid pressure, each inner portion acting as a fulcrum point, the parts being so constructed and arranged that the resultant of forces generated by said fluid pressure on said inner faces of said lips acts to force the radially inward edges of said outer portions into surface to surface contact with the adjacent opposed surface.

References Cited in the file of this patent
UNITED STATES PATENTS

| | | |
|---|---|---|
| 1,339,636 | Tulloch | May 11, 1920 |
| 1,834,581 | Ferrell | Dec. 1, 1931 |
| 2,269,486 | Santoro | Jan. 13, 1942 |
| 2,384,672 | Gleeson | Sept. 11, 1945 |
| 2,513,178 | Jackson | June 27, 1950 |
| 2,717,793 | Nenzell | Sept. 13, 1955 |
| 3,074,427 | Wheeler | June 22, 1963 |

FOREIGN PATENTS

| | | |
|---|---|---|
| 865,547 | Great Britain | Apr. 19, 1961 |